Patented July 14, 1953

2,645,670

UNITED STATES PATENT OFFICE 2,645,670

PRODUCTION OF POLYALKYLATED AROMATIC HYDROCARBONS

Herman Pines and Vladimir N. Ipatieff, Chicago, Ill., assignors to Universal Oil Products Company, Chicago, Ill., a corporation of Delaware No Drawing. Application October 26, 1950, Serial No. 192,368

5 Claims. (Cl. 260—668)

This invention relates to the conversion of a saturated bicyclic hydrocarbon into a polyalkylated aromatic hydrocarbon. More particularly, this process relates to the conversion of pinane into a polymethylated benzene hydrocarbon.

An object of this invention is to produce a polyalkylated aromatic hydrocarbon.

Another object of this invention is to produce a polymethylbenzene hydrocarbon.

One embodiment of this invention relates to a process for producing a polyalkylated aromatic hydrocarbon which comprises reacting a saturated bicyclic hydrocarbon in the presence of an acid-acting compound and of a dehydrogenation catalyst and recovering the resultant polyalkylated aromatic hydrocarbon.

Another embodiment of this invention relates to a process for producing a polymethylated benzene hydrocarbon which comprises reacting pinane in the presence of a hydrogen halide and of a platinum catalyst at a dehydrogenation temperature and recovering the resultant polymethylated benzene hydrocarbon.

A further embodiment of this invention relates to a process for producing a tetramethylbenzene which comprises reacting pinane at a dehydrogenation temperature in the presence of hydrogen chloride and a platinum-alumina catalyst and recovering the resultant tetramethylbenzene hydrocarbon.

We have found that when a saturated bicyclic hydrocarbon such as pinane is passed over a dehydrogenation catalyst in the presence of an acid-acting compound, dehydrogenation and isomerization reactions occur producing a polyalkylated hydrocarbon such as a tetramethylbenzene. This reaction is illustrated by the following equation in which hydrogen chloride is indicated as the acid-acting compound.

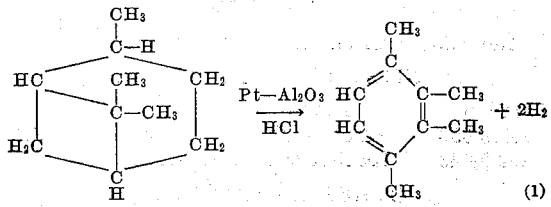

(1)

Other acid-acting compounds may be employed similarly or an alkyl halide may be added to the reaction mixture so as to generate an acidic compound in situ in the reaction mixture. The alkyl halide added in this manner is generally from about 1 to about 5% by weight of the bicyclic hydrocarbon being treated. This production of a tetramethylbenzene in the presence of hydrogen chloride and of a platinum catalyst is different from the reaction which occurs when pinane is dehydrogenated in the presence of a platinum catalyst but in the absence of an acid-acting compound. When no acid-acting compound is present, the dehydrogenation of pinane in the presence of a platinum-alumina catalyst yields a trimethylbenzene, methane, and hydrogen as indicated by the following equation:

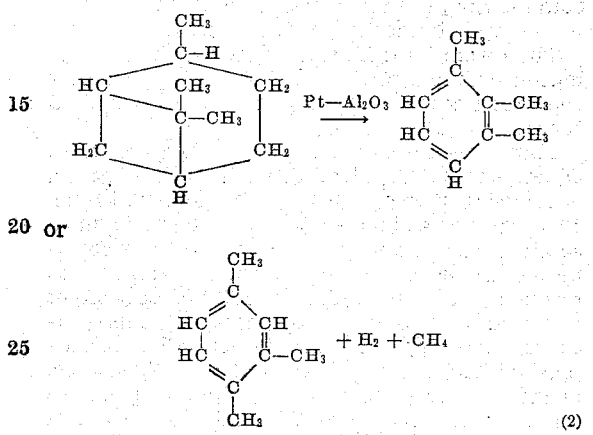

(2)

In the presence of such acid-acting catalysts, the reaction products comprise essentially polymethylated benzene hydrocarbons and hydrogen, whereas in the absence of the acid-acting compound, but in the presence of the dehydrogenation catalyst, the dehydrogenation is generally accompanied by loss of methane as indicated in Equation 2 above. When methane is lost during the dehydrogenation reaction, the aromatic hydrocarbon which is also formed at the same time is less highly methylated than that produced in the presence of the same dehydrogenation catalyst and an added acid-acting compound such as a hydrogen halide, and preferably hydrogen chloride or hydrogen bromide.

Catalysts preferred for this process contain platinum and consist preferably of platinum deposited upon suitable carriers such as activated carbon, activated alumina, crushed porcelain, pumice, silica, and the like. Other catalysts which may also be used in the process, although not necessarily under the same conditions of operation, include the oxides of elements of the left-hand columns of groups IV, V, and VI of the periodic table or mixtures thereof and more particularly composites of alumina and chromia or of alumina and molybdenum oxide. The catalysts which contain platinum are generally employed at a dehydrogenation temperature of from about 250° to about 425° C., whereas the above-mentioned catalysts which do not contain platinum are generally utilized at a temperature of from about 400° to about 550° C.

Alkyl aromatic hydrocarbons formed by this process are useful as solvents, as intermediates in organic synthesis as in the production of dyes, medicinals, insecticides, etc. Some of the lower boiling polyalkylated aromatic hydrocarbons have high anti-knock qualities and are accordingly valuable components of gasolines.

Although the acid-acting material or acid producing material which may be employed in this process to promote isomerization during dehydrogenation of saturated bicyclic hydrocarbons may be added continuously or intermittently together with the hydrocarbon charging stock, a dehydrogenation catalyst may also be prepared in which a stable acid-acting compound is present therein as well as a material which promotes dehydrogenation. Thus the presence of small amounts of an acid-acting silica-alumina composite with a dehydrogenation catalyst, particularly a dehydrogenation catalyst containing platinum, will promote both dehydrogenation and isomerization. Also the addition of a small amount of hydrofluoric or hydrochloric acid to alumina forms an acid-type catalyst support suitable for promoting the dehydrogenation and isomerization reactions of this process.

The invention is illustrated further by the following example but it is to be understood that the broad scope of the invention is not limited thereto.

Platinum-alumina catalyst, (H. Pines, R. C. Olberg and V. N. Ipatieff, J. Amer. Chem. Soc. 70, 533 (1948) was prepared by heating platinum, 12.0 grams on a steam-bath with aqua regia, until solution was complete. The excess acid was removed by evaporating the solution almost to dryness and then adding a 100 cc. portion of water and again evaporating down; this procedure was repeated ten times. The chloroplatinic acid so formed was dissolved in 200 cc. of distilled water and suction filtered to remove any contaminants. The clear filtrate was added to 150 cc. (120 grams) of 10–12 mesh alumina so that the liquid completely covered the alumina. The solution was evaporated on a steambath with thorough stirring. When dry the catalyst had a uniform yellow-orange color. It was heated in a vertical furnace at 100° C. in an atmosphere of hydrogen for several hours. The temperature was then raised to 200° C. and the heating continued for several more hours. Finally, it was heated at 254° C. for two hours prior to use for dehydrogenation. The reduced catalyst had a uniform gray color.

Pinane is passed over a platinized-alumina catalyst prepared as indicated above and containing 7% by weight of platinum maintained at a temperature of 300° C. The pinane is passed over the catalyst at a rate corresponding to an hourly liquid space velocity of 0.2. During this treatment a gas is formed containing 30% by volume of methane and 70% of hydrogen. The recovered liquid product contains 30% of unconverted pinane together with a mixture of aromatic hydrocarbons consisting of 1,2,3-trimethylbenzene and 1,3,4-trimethylbenzene.

In another run similar to that described above, a mixture of pinane and 5% of its weight of butyl chloride is passed over the same platinum-alumina catalyst at a temperature of 300° C. and at an hourly liquid space velocity of 0.2. In this treatment approximately 2 molecular proportions of gas form per molecular proportion of pinane undergoing reaction. This mixture consists essentially of hydrogen containing not more than about 5 volume % of methane. The recovered liquid products contain about 40% by volume of unconverted pinane together with polymethylated benzene hydrocarbons consisting predominately of 1,2,3,4-tetramethylbenzene.

We claim as our invention:

1. A process for producing 1,2,3,4-tetramethylbenzene which comprises reacting pinane at a temperature of from about 250° to about 425° C. in the presence of a platinum catalyst and a halide selected from the group consisting of a hydrogen halide and an alkyl halide to effect dehydrogenation and isomerization and form a reaction product containing 1,2,3,4-tetramethylbenzene and hydrogen, and recovering said tetramethylbenzene from the reaction product.

2. A process for producing 1,2,3,4-tetramethylbenzene which comprises reacting pinane at a temperature of from about 250° to about 425° C. in the presence of a platinum catalyst and an alkyl halide to effect dehydrogenation and isomerization and form a reaction product containing 1,2,3,4-tetramethylbenzene and hydrogen, and recovering said tetramethylbenzene from the reaction product.

3. The process of claim 1 further characterized in that said catalyst comprises platinum supported on alumina and said halide is hydrogen chloride.

4. A process for producing 1,2,3,4-tetramethylbenzene which comprises reacting a mixture of pinane and from about 1 to about 5% by weight of an alkyl halide at a temperature of from about 250° to about 425° C. in the presence of a platinum-alumina catalyst to effect dehydrogenation and isomerization forming a reaction product containing 1,2,3,4-tetramethylbenzene, and recovering said 1,2,3,4-tetramethylbenzene from the resultant reaction product.

5. A process for producing 1,2,3,4-tetramethylbenzene which comprises reacting a mixture of pinane and from about 1 to about 5% by weight of a butyl chloride at a temperature of from about 250° to about 425° C. in the presence of a platinum-alumina catalyst to effect dehydrogenation and isomerization forming a reaction product containing 1,2,3,4-tetramethylbenzene, and recovering said 1,2,3,4-tetramethylbenzene from the resultant reaction product.

HERMAN PINES.
VLADIMIR N. IPATIEFF.

References Cited in the file of this patent

UNITED STATES PATENTS

| Number | Name | Date |
|---|---|---|
| 2,419,690 | Pines et al. | Apr. 29, 1947 |
| 2,435,443 | Ipatieff et al. | Feb. 3, 1948 |

OTHER REFERENCES

"The Terpenes," Simonsen, vol. II, 1932, Cambridge University Press, London, page 85.